(12) United States Patent
Sethi (10) Patent No.: US 12,062,104 B2
(45) Date of Patent: Aug. 13, 2024

(54) SYSTEMS AND METHODS FOR SECURITY ALERTS

(71) Applicant: VISA INTERNATIONAL SERVICE ASSOCIATION, San Francisco, CA (US)

(72) Inventor: Vikash Kumar Sethi, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 252 days.

(21) Appl. No.: 16/459,242

(22) Filed: Jul. 1, 2019

(65) Prior Publication Data

US 2021/0004927 A1     Jan. 7, 2021

(51) Int. Cl.
| | |
|---|---|
| *G06Q 20/38* | (2012.01) |
| *G06Q 20/10* | (2012.01) |
| *G06Q 20/40* | (2012.01) |
| *G06Q 50/26* | (2012.01) |
| *H04L 9/40* | (2022.01) |

(52) U.S. Cl.
CPC ....... *G06Q 50/265* (2013.01); *G06Q 20/1085* (2013.01); *G06Q 20/4012* (2013.01); *G06Q 20/4016* (2013.01); *H04L 63/083* (2013.01); *H04L 63/308* (2013.01); *G06Q 2220/00* (2013.01)

(58) Field of Classification Search
None
See application file for complete search history.

(56) References Cited

U.S. PATENT DOCUMENTS

| 5,354,974 | A | * | 10/1994 | Eisenberg | G06Q 20/341 235/379 |
|---|---|---|---|---|---|
| 5,548,632 | A | | 8/1996 | Walsh | |
| 5,731,575 | A | * | 3/1998 | Zingher | G07F 19/20 235/379 |
| 5,764,789 | A | * | 6/1998 | Pare, Jr. | G06Q 20/10 382/224 |
| 8,474,695 | B1 | * | 7/2013 | McCoy | G07F 19/209 235/379 |
| 2002/0165829 | A1 | * | 11/2002 | Jones | G07F 7/1025 705/72 |
| 2004/0158525 | A1 | * | 8/2004 | Dort | G06Q 20/40 705/44 |

(Continued)

OTHER PUBLICATIONS

Rathore, "Analysis of vulnerability and security issues over auto teller machine transactions and design of a general security model", Department of Computer Science, 2014, 25 pages.

(Continued)

*Primary Examiner* — John W Hayes
*Assistant Examiner* — Cristina Owen Sherr
(74) *Attorney, Agent, or Firm* — K&L Gates LLP (57) ABSTRACT

A method of including receiving a first input from a user and determining that the first input matches at least a portion of an account number associated with a user account of the user. Based on the determination the method may include requesting and receiving a second input from the user that may include a second string of numbers. The method may also include determining that the second input is a combination of a PIN associated with the user account. Based on the determination, the method may include executing a contingency action.

18 Claims, 5 Drawing Sheets

(56) References Cited

U.S. PATENT DOCUMENTS

| | | | |
|---|---|---|---|
| 2004/0158526 A1* | 8/2004 | Dort | G06Q 20/40 |
| | | | 705/44 |
| 2005/0033703 A1* | 2/2005 | Holdsworth | G06Q 20/3821 |
| | | | 705/67 |
| 2007/0080217 A1 | 4/2007 | Brabant | |
| 2007/0083466 A1* | 4/2007 | Crowell | H04L 12/5601 |
| | | | 705/43 |
| 2008/0195540 A1* | 8/2008 | Gee | G06Q 20/1085 |
| | | | 705/43 |
| 2009/0247123 A1* | 10/2009 | Lee | G07F 7/1025 |
| | | | 455/410 |
| 2009/0259588 A1* | 10/2009 | Lindsay | G06F 21/31 |
| | | | 705/40 |
| 2009/0307141 A1* | 12/2009 | Kongalath | G06Q 20/403 |
| | | | 235/382 |
| 2013/0282576 A1* | 10/2013 | Kinsey | G07F 19/20 |
| | | | 705/43 |
| 2014/0198054 A1* | 7/2014 | Sharma | H04M 1/724 |
| | | | 345/173 |
| 2015/0142595 A1* | 5/2015 | Acuna-Rohter | G06Q 30/06 |
| | | | 705/21 |
| 2017/0069051 A1* | 3/2017 | Petitt, Sr. | G06Q 20/1085 |
| 2019/0007396 A1* | 1/2019 | Krummel | G06F 21/34 |
| 2019/0058712 A1* | 2/2019 | Jones | G06F 21/629 |
| 2020/0329359 A1* | 10/2020 | Katz | H04W 4/90 |

OTHER PUBLICATIONS

Wikipedia, "ATM SafetyPIN software", https://en.wikipedia.org/wiki/ATM_SafetyPIN_software, 3 pages.

* cited by examiner

SYSTEMS AND METHODS FOR SECURITY ALERTS

FIELD OF THE INVENTION

The invention relates to systems and methods for monitoring and reacting to security alerts.

BACKGROUND

Automated teller machines (ATMs) may often be located in public areas, such as storefronts, on sidewalks, drive-up or walk-up off-street installations, etc. The varying and publically accessible location of ATMs provides users with the ability to access their funds or make deposits with great convenience at almost any time of day. Unfortunately, in part due to this accessibility, ATM users may be vulnerable to muggings, theft, or other attacks by perpetrators during or soon after a user accesses an ATM.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 6 is a flow chart of another embodiment of a process of using the system for security alerts in accordance with the disclosure Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In an embodiment, the disclosure describes receiving a first input from a user, where the first input including a first string of numbers, and determining that the first string of numbers matches at least a portion of an account number associated with a user account of the user. Based on the determination that the first string of numbers matches at least a portion of the account number, the method may include requesting a second input from the user. The method may also include receiving the second input from the user, where the second input may include a second string of numbers. The method may include determining that the second string of numbers is a combination of a personal identification number (PIN) associated with the user account. Based on the determination that the second string of numbers is a combination of the PIN, the method may include executing at least one contingency action.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The disclosure describes a security alert system that may, in some embodiments, provide methods for receiving user inputs indicative of an elevated threat level to the user while using an automated teller machine (ATM) or other account access or monetary transaction device. Traditionally, users accessing user accounts via an ATM that become victims of muggers, thieves, and other attackers may not have options to alert authorities, financial institutions, etc., without alerting their attacker of their attempts to summon help. The security alert system may, in some embodiments, implement one or more contingency actions related to a user account in response to a particular input from a user that may not be detectable by an attacker. In some embodiments, the user inputs indicating an elevated threat level may be designed so as to be substantially indiscernible by an attacker who may be forcing the user to extract money from an ATM under duress. ATMs may have only limited inputs and interfaces for a user to provide information, and so the system may include recognizing specialized user inputs performable with only the resources of a traditional ATM. For example, in some embodiments, the security alert system may include recognizing user inputs for a two-step process for a user to signal the system of an increased threat level. In such embodiments, a first step may indicate that a threat may be present, and a second step may indicate the level of the perceived threat to the user. In some embodiments, the security alert system may respond by executing contingency actions, such as by limiting access to user accounts, locking user accounts, alerting local authorities that a crime is in progress at the ATM location, taking a photograph of the threatening incident, etc. Thus, at least some practical applications of the security alert system may be to prevent muggings, theft, or other criminal acts, limit the monetary losses to victims of such attacks, and/or to provide a substantially immediate alert to law enforcement entities that may be able to stop or to subsequently catch the perpetrators in such events. Additionally, the system may provide the practical application of allowing a user to report a theft or mugging in progress without alerting the perpetrator to the user's reporting activities. Using the systems and methods described herein may increase the safety of users accessing their accounts via ATMs or other similar account access platforms and reduce related crimes.

In some embodiments, the disclosure describes a method of using the security alert system described herein may include receiving a first input from a user. The first input including a first string of numbers. The method may include determining that the first string of numbers matches at least a portion of an account number associated with a user account of the user. Based on the determination that the first string of numbers matches at least a portion of the account number, the method may include requesting a second input from the user, and receiving the second input from the user. The second input may include a second string of numbers. The method may also include determining that the second string of numbers is a combination of a personal identification number (PIN) associated with the user account. Based on the determination that the second string of numbers is a combination of the PIN, the method may include executing at least one contingency action. In some embodiments, the method may be performed using one or more processors.

In another embodiment, the method includes receiving a selection from a user of a first contingency action and a selection from the user of a second contingency action. The first and second contingency actions being associated with a user account of the user. The method also includes receiving a first input from a user. The first input may include a first string of numbers. The method may also include determining that the first string of numbers matches a predetermined emergency input for an account associated with the user. Based on the determination that the first string of numbers matches a predetermined first emergency input for an account associated with the user, the method includes requesting a second input from the user. The method includes receiving the second input from the user. The second input may include a second string of numbers. The method may also include determining that the second string of numbers is a combination of a personal identification number (PIN) associated with the user account. Based on the determination that the second string of numbers is a combination of the PIN, the method may include executing at least one of the first contingency action or the second contingency action. In some embodiments, the method is performed using one or more processors.

In another embodiment, a method of using the security alert system may include receiving a selection from a user of a first contingency action and a selection from the user of a second contingency action. The first and second contingency actions may be associated with a user account of the user. The method may include receiving a first input from a user, where the first input may a first string of numbers. The method may include determining that the first string of numbers matches at least a portion of an account number associated with the user account. Based on the determination that the first string of numbers matches a predetermined first emergency input for an account associated with the user, the method includes requesting a second input from the user. The method may include receiving the second input from the user, where the second input may include a second string of numbers. The method may include determining that the second string of numbers is one of a first predetermined permutation of a personal identification number (PIN) or a second predetermined permutation of the PIN. The method may also include executing the first contingency action upon determining that the second string of numbers is the first predetermined permutation of the PIN and executing a second contingency action upon determining that the second string of numbers is a second predetermined permutation of the PIN.

Figure 1:
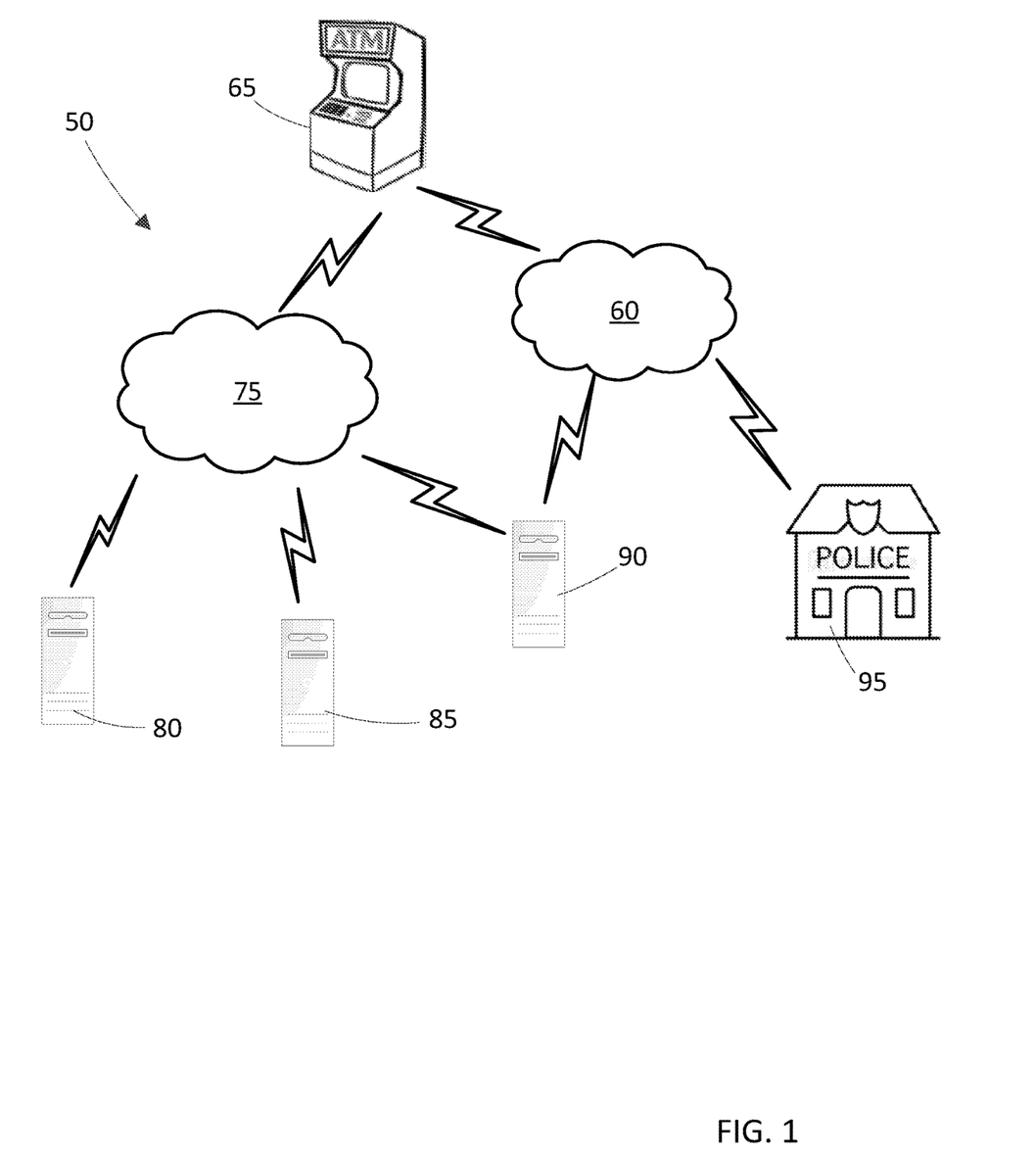
FIG. 1 is an illustration of the elements of an embodiment of a system that includes a system for security alerts in accordance with the disclosure.

A high level illustration of some of the elements in a sample computing system 50 that may be physically configured to implement the security alert system is illustrated in FIG. 1. The system 50 may include one or more ATMs 65 that may, in some embodiments, be connected to a network, such as digital communications network 60 like the Internet, or a secure payment network 75. Although ATMs are referred to herein and are commonly used to withdraw and deposit money, it is contemplated that the security alert system may be implemented in other contexts, such as kiosks, vending machines, etc., that link a user to an account or account number. The payment network 75 may be an electronic payment system used to accept, transmit, or process transactions made by users with payment cards for money, goods, or services, and to transfer information and funds among payment card issuers, banks, merchants, payment card holders, payment processors, acquirers, etc. In the illustrated embodiment, at least the a token server 80, one or more issuer servers 85, and a security alert server 90 may be connected to the ATM 65 via the payment network 75; however, it is contemplated that other entities may be connected as well in some embodiments. The security alert server 90 may be affiliated or operate by or as part of a financial institution, such as a bank, credit card company, credit card issuer, etc. Alternatively, the security alert server 90 may be operated by an independent entity with that may partner with financial institutions for access to user accounts. It is also contemplated that other entities, such as law enforcement agencies 95 or other security entities, may be connected to the ATM 65 or the security alert server 90 via the payment network 75 or another digital communications network 60.

Figure 2:
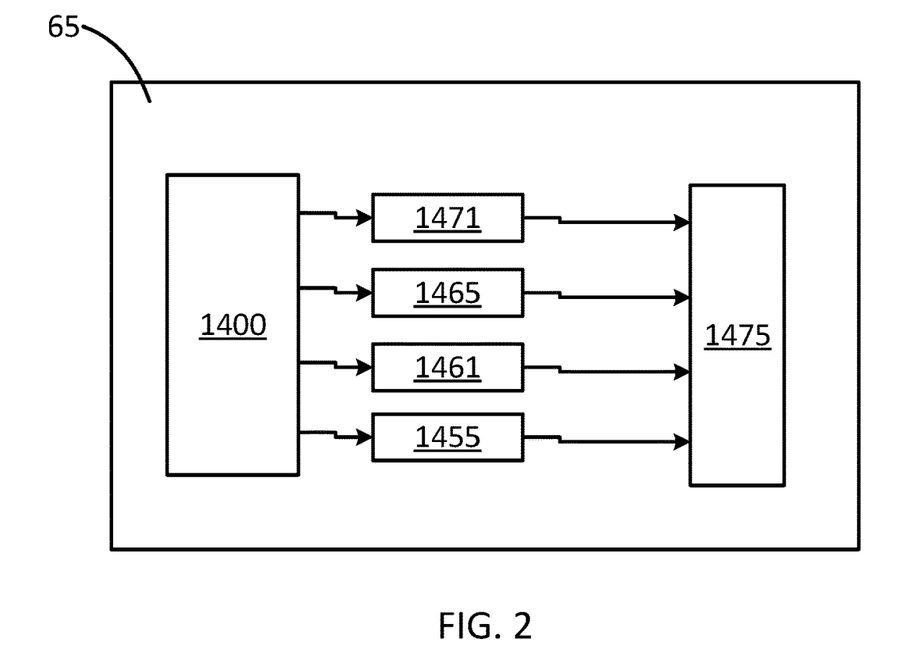
FIG. 2 is a schematic illustration of elements of an embodiment of an example computing device.
Figure 3:
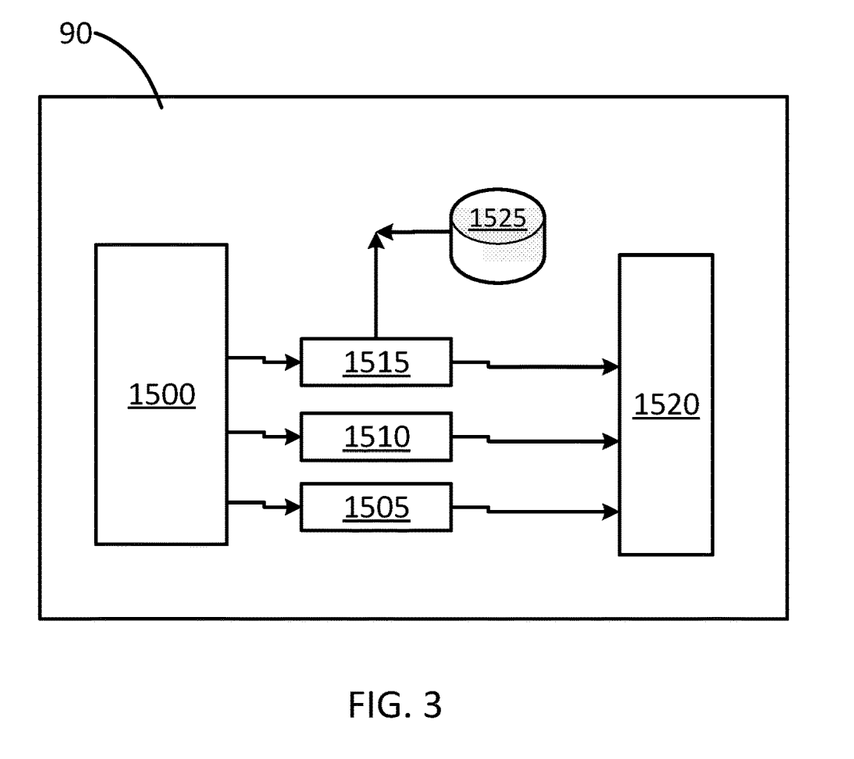
FIG. 3 is a schematic illustration of elements of an embodiment of a server type computing device.

FIG. 2 is a simplified illustration of the physical elements that make up an embodiment of an ATM 65 or other computing device and FIG. 3 is a simplified illustration of the physical elements that make up an embodiment of a server type computing device, such as the security alert server 90, but the token server 80 and the issuer servers 85 may reflect similar physical elements in some embodiments. Referring to FIG. 2, a sample ATM 55, which may be a computing device, is illustrated that is physically configured according to be part of the computing system 50 shown in FIG. 1. The ATM 65 may have a processor 1451 that is physically configured according to computer executable instructions. In some embodiments, the processor can be specially designed or configured to optimize communication between an issuer servers 85 and the ATM 65 relating to the security alert system described herein. The ATM 65 may have a portable power supply 1455 such as a battery, which may be rechargeable, or may be powered via an electrical cable. It may also have a sound and video module 1461 which may assist in displaying video and sound and may turn off when not in use to conserve power and battery life. The ATM 65 may also have volatile memory 1465 and non-volatile memory 1471. The ATM 65 may have GPS capabilities that may be a separate circuit or may be part of the processor 1451. There also may be an input/output bus 1475 that shuttles data to and from the various user input/output devices such as a microphone, a camera 59, a display 56, or other input/output devices such as numerical or alphanumeric keypads. The ATM 65 also may control communicating with the networks, such as communication network 60 in FIG. 1, either through wireless or wired devices. Of course, this is just one embodiment of the ATM 65 and the number and types of portable ATMs or other computing devices is limited only by the imagination.

The physical elements that make up an embodiment of a server, such as the security alert server 90, are further illustrated in FIG. 3. In some embodiments, the security alert server 90 is specially configured to run the security alert system as described herein. At a high level, the security alert server 90 may include a digital storage such as a magnetic disk, an optical disk, flash storage, non-volatile storage, etc. Structured data may be stored in the digital storage such as in a database. More specifically, the security alert server 90 may have a processor 1500 that is physically configured according to computer executable instructions. In some embodiments, the processor 1500 can be specially designed or configured to optimize communication between a portable computing device, such as ATM 65, and the security alert server 90 relating to the security alert system as described herein. The security alert server 90 may also have a sound and video module 1505 which assists in displaying video and sound and may turn off when not in use to conserve power and battery life. The server 90 may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, keypad, etc. The input/output bus 1520 also may control communicating with the networks, such as communication network 60 and payment network 75, either through wireless or wired devices. In some embodiments, a security alert controller for running the security alert system may be located on the ATM 65. However, in other embodiments, the security alert controller may be located on security alert server 90, or both the ATM 65 and the server 90. Of course, this is just one embodiment of the security alert server 90 and additional types of servers are contemplated herein.

Figure 4:
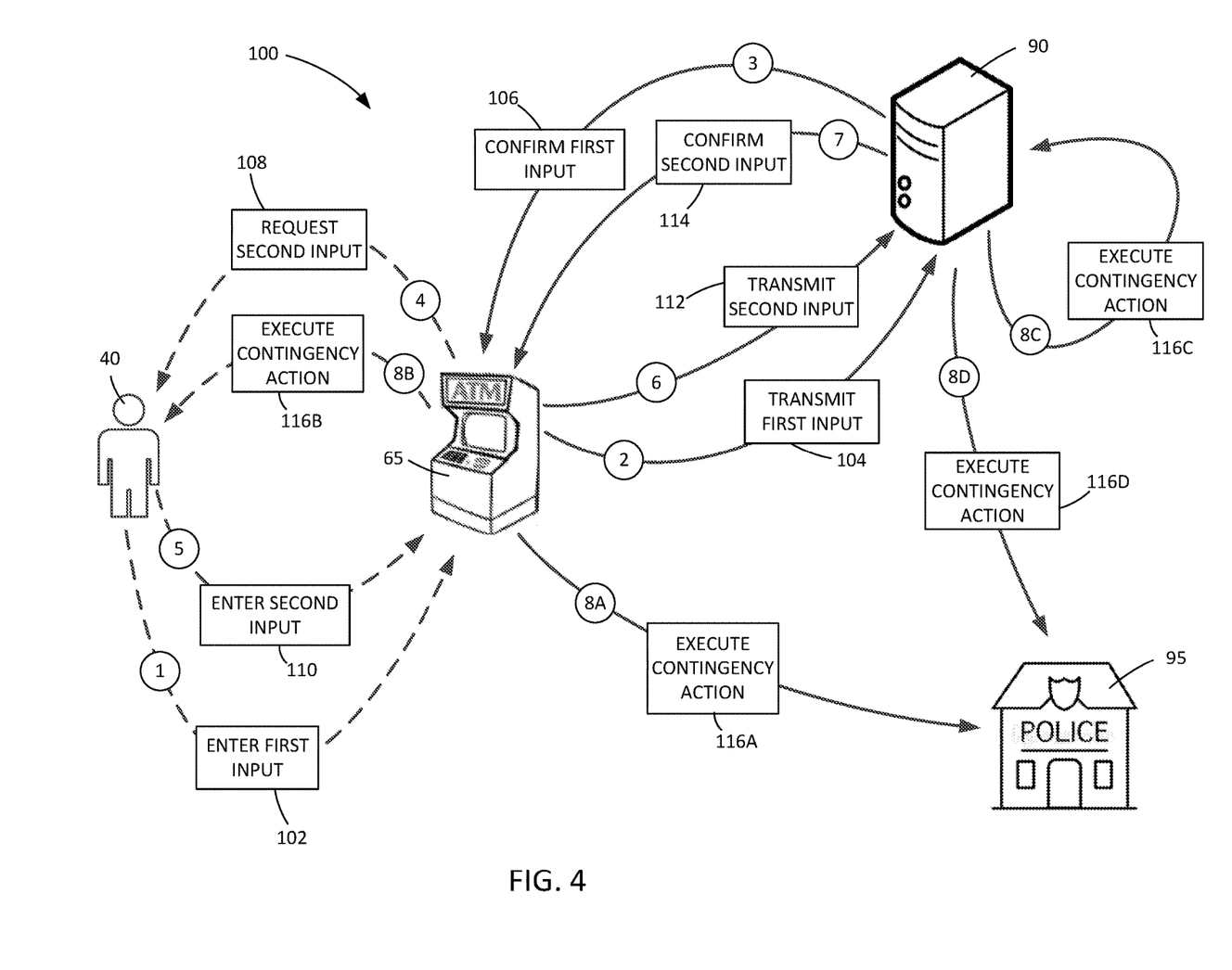
FIG. 4 is a data flow diagram of an embodiment of a system for security alerts in accordance with the disclosure.

FIG. 4 is a data flow diagram of an embodiment of a security alert system 100 that may monitor and provide alerts related to users under duress or under other threat while accessing user accounts. In some embodiments, a user 40 may initiate an ATM process by inserting or swiping a card associated with a user account, or by holding a mobile computing device or other near field communication (NFC) or other wireless device near the ATM 65. Upon initiating the ATM process, the ATM 65 may request an input from the user 40. For example, under normal conditions, a user 40 may enter a personal identification number (PIN) to gain access to the user's account for completing a transaction such as withdrawing cash, depositing a check or cash, checking account balances, etc. At 102, a user 40 may enter a first input into an ATM 65 using, for example, an alphanumeric keypad or on-screen digital keypad. The first input may be a user PIN, as described above. However, in some embodiments, if the user determines that he/she may be under threat of criminal activity, such as muggings, theft, robbery, etc., the user may decline to enter the PIN. Instead, the user may choose to enter a primary threat indicator input that may indicate the user perceives he/she is under threat.

In some embodiments, the user may set up the user account by choosing one or more predetermined inputs as a primary threat indicator input. For example, the primary threat indicator input may be a string of numbers that may be different than the PIN number to indicate a potentially threatening situation. In some embodiments, the primary threat indicator input may be at least a portion of an account number associated with the user account. For example, if a user account number is twelve digits long, the primary threat indicator input may be the last four digits of the account number. In some embodiments, the primary threat indicator input may be the first or middle four digits of the account number. In some embodiments, the account card presented to the ATM 65 to initiate the ATM interaction may be labeled with the account number. In such embodiments, the primary threat indicator input may be relatively easy for the user to remember, even under stressful conditions, as the user may simply read the numbers off the card while at the ATM. In some embodiments, the primary threat indicator input may be the reverse order of at a portion of the account number. Of course, those skilled in the art will recognize that the primary threat indicator input may substantially any predetermined string of numbers or letters other than the PIN.

At 104, once the ATM 65 receives the first string of numbers in the first input, the ATM may, in some embodiments, transmit the first input to the security alert server 90. In some embodiments, the security alert server 90 may have access to a database or other repository of user account information that may include the correct primary threat indicator input for the user. In some embodiments, the primary threat indicator input may be chosen by the user and stored with reference to the user account, and in some embodiments the primary threat indicator input may be assigned to the user randomly or with reference to other account information, e.g., portions of the user account number. The security alert server 90 may determine whether the first input received from the user 40 via the ATM 65 matches the thread indicator input stored for the user account. If not, the server 90 may transmit a message or signal back to the ATM 65 indicating that no match was found. If the first input does match the user's primary threat indicator input, then the security alert server 90 may, at 106, transmit a message to the ATM 65 confirming that the first input received by the ATM 65 matches the primary threat indicator input associated with the user account. The confirmation by the security alert server 90 may shift the ATM 65 into a threat alert mode because the user has indicated that the user perceives a potential threat. In some embodiments, confirmation that the first input matches the primary threat indicator input may cause either the ATM 65, the security alert server 90, or both to execute one or more contingency actions as described in greater detail below.

In some embodiments, based on the message or signal from the security alert server 90 confirming the first input matches a predetermined primary threat indicator input, the ATM 65 may request a second input from the user at 108. In some embodiments, the ATM 65 may present the request for the second input in a manner that may not indicate to a third party that the user has triggered the ATM's threat indicator mode. For example, in some embodiments, a display on the ATM 65 may indicate that the previously entered input was incorrect for the user account and request that the user re-enter the user's identification number. In some embodiments, the ATM 65 may simply request that user enter the user's PIN to access the user account as if no previous inputs had been provided. In some embodiments, the ATM 65 may change the color of the text or background of the ATM display to indicate a threat indicator mode has been initiated such that the user may understand the significance but a potential attacker may not. In some embodiments, the user may set up the user's account to include the user's choice of any of a variety of queues to indicate the threat indicator mode without alerting an attacker.

At 110, the user 40 may enter a second input in response to the ATM 65 request. The second input may include a second string of numbers, letters, or a combination of both. At 112, the ATM 65 may transmit the second string of numbers entered as the second input to the security alert server 90 for confirmation. Similar to the first input and the primary threat indicator input, in some embodiments, the user may have previously set up the user account to include a secondary threat indicator input. In some embodiments, however, it is contemplated that the secondary threat indicator input may be assigned to the user account randomly or based on other aspects of the user account. For example, in some embodiments, the secondary threat indicator input may be the user's original PIN that, had it been entered for the first input, would have simply granted access to the user account. In some embodiments, the secondary threat indicator input may be any combination of the user's PIN. For example, the secondary threat indicator input may be any re-arranged version of the original PIN; e.g., if the original PIN is 1-2-3-4, then the secondary threat indicator input may be the reverse order (4-3-2-1), a random order (e.g., 2-1-4-3) or any other combination. In some embodiments, the secondary threat indicator input may be any of a specific permutation of the numbers in the user PIN. For example, if the PIN is 2-4-3-1, the secondary threat indicator input may specifically be the permutation of those numbers 4-3-1-2, or any other specific permutation chosen by the user or assigned by the system. In some embodiments, the secondary threat indicator input may be the permutation resulting from swapping the first two digits of a four-digit PIN with the last two digits. For example, if the PIN is 2-4-3-1, the secondary threat indicator input may be 3-1-2-4. Those skilled in the art will understand that many other combinations or permutations of the PIN may be used as well.

In some embodiments, the secondary threat indicator may instead be a randomly assigned string of numbers or letters, or may be a combination or specific permutation of the account number, a portion of the account number, or a portion of the first string of numbers entered as the first input or primary threat indicator input. For example, if the primary threat indicator input is 1-2-3-4 to initiate the threat indicator mode, the secondary threat indicator input may be any combination of the digits in the primary threat indicator input. In some embodiments, the secondary threat indicator input may be a specific permutation of the primary threat indicator input, either chosen by the user or predetermined by the server 90 or system 100. Those skilled in the art will understand that other combinations of numbers or letters, either related to or unrelated to the account number, the PIN number, or the first input, may be used as the secondary threat indicator input in some embodiments. In some embodiments, the ATM 65 may request a third input from the user 40, such as to finally allow at least one emergency transaction with the user account.

In some embodiments, if the security alert server 90 determines that the second input from the user matches the secondary threat indicator input, the server 90 may, at 114, transmit a message or signal confirming that the match. In some embodiments, the confirmation that the second input that may include second string of numbers matches the secondary threat indicator input may trigger one or more contingency actions by the ATM 65 and/or the security alert server 90. The contingency actions may take a variety of forms in differing embodiments and in differing scenarios. In some embodiments, the ATM 65, at 116A, may transmit a message or signal to a law enforcement agency 95 or other security entity indicating that a user of the ATM perceives a threat. The law enforcement agency may then dispatch personnel to the location of the ATM 65 to stop the threat, provide aid to the user, or apprehend an attacker. In some embodiments, the signal or message to the law enforcement agency may include a location of the ATM 65 from stored data or GPS features of the ATM. In some embodiments, the ATM 65 may include a camera, microphones, or other sensing technology that may take a photograph, video, and/or sound recording of the user, the attacker, or the area around the ATM and send the photograph or video to the law enforcement agency. At 116D, the security alert server 90 may alternatively, or additionally, transmit a signal or message to the law enforcement agency 95 alerting them that the user is under threat at a particular ATM similar to those described with respect to 116A. In some embodiments, the ATM 65 may not have direct connection to the law enforcement agency 95 and the security alert server 90 may provide the alert instead.

In some embodiments, the ATM 65 may, at 116B, execute one or more contingency actions vis-à-vis the user 40 and its immediate interaction with the ATM. For example, the ATM 65 may, in some embodiments, refuse to distribute any cash from the ATM to the user 40 for the current transaction, or allow the user account to be manipulated or accessed in any way. In some embodiments, the ATM 65 may allow a single withdrawal of cash after the second input in the event that an attacker may be satisfied upon receiving the cash and leave the user alone. In some embodiments, such a single cash withdrawal may be limited to a maximum dollar amount, or may be a predetermined portion of the requested amount (e.g., one half, one third, one quarter, etc.). In some embodiments, the ATM 65 may block access to the user account using that ATM, or block all cards or accounts associated with the user 40 from being accessed. In some embodiments, the account blocking may be temporary (e.g., several hours, one day, two days, etc.), or may be permanent until the user unlocks the user account by contacting an account administrator, logging into the account via a computer or other access point, etc. In some embodiments, the ATM 65 may block all access to any account, user or otherwise, for a predetermined time period or until an administrator unlocks access. Those skilled in the art will recognize that other suitable contingency actions may be taken by the ATM 65 in response to the first or second threat indicator inputs in other embodiments.

At 116C, the security alert server 90 may, alternatively or additionally, execute one or more contingency actions in response to receiving a second input from the ATM 65 that matches a secondary threat indicator input. For example, in some embodiments, the security alert server 90 may limit or lock access to the user account from any ATM and/or from other remote locations, such as via online access. In some embodiments, the lock out or limitations may be temporary, or may be permanent until the user or an administrator unlocks them. In some embodiments, the security alert server 90 may block or limit access to all accounts or credit cards associated with the user, either permanently or for a predetermined length of time.

In some embodiments, the security alert server 90 may analyze historical data for input of threat indicator inputs by one or more users across many ATM locations. The security alert server 90 may determine, based on the historical data, that users of certain ATMs encounter increased numbers or degrees of threats when the ATM is accessed at certain times of day, on certain days of the week, month, or year, etc. When the security alert server 90 determines that threatening activity occurs more regularly at a specific time or day at a particular ATM location, the server 90 or other entity may block that ATM from dispensing money or otherwise accessing user accounts during the identified time period. In some embodiments, the security alert server 90 may analyze the historical data using machine learning techniques or other statistical and data analysis in order to determine how to reduce instances of threatening activity at or near ATMs or other account access points.

In some embodiments, once the first input is confirmed to match the primary threat indicator input and the ATM 65 may enter threat alert mode, the second input may be one of several possible secondary threat indicator inputs that may indicate, for example, varying levels of perceived danger by the user. For example, in some embodiments, the user account may be set up such that if the normal PIN is entered as the second string of numbers entered for the second input, the ATM 65 and/or the security alert server 90 may execute a contingency action with relatively low restrictiveness— e.g., limit the overall withdrawals from the user account to a maximum amount, but not lock access to the account. However, if the user enters some combination or specific permutation of the PIN, the ATM 65 and/or the security alert server 90 may execute an alternative or additional contingency action with relatively high restrictiveness—e.g., lock out access to the user account, notify law enforcement, etc. In some embodiments, the varying levels of perceived threat may be indicated by differing permutations of the user's PIN as the second input. For example, in some embodiments, the ATM 65 and/or security alert server 90 may execute a first contingency action upon determining that the second string of numbers in the second input is a first predetermined permutation of the PIN, and may execute a second contingency action upon determining that the second string of numbers is a second predetermined permutation of the PIN. In some embodiments, the first contingency action may be different than the second contingency action, or the second contingency action may include the first contingency action in addition to another action. In some embodiments, the first predetermined permutation of the PIN may indicate a first perceived level of danger, and the second predetermined permutation of the PIN may indicate a second perceived level of danger higher than the first perceived level of danger. In some embodiments, the first predetermined permutation may be a reverse order of the numbers in the PIN, and the second predetermined permutation of the PIN may swap the first two numbers of the string of numbers with the last two numbers. In some embodiments, strings of numbers that are easier for a user to remember (e.g., the reverse order of the PIN), may be used to indicate relatively low levels of threat, while strings of numbers that are more difficult for a user to remember (e.g., a specific permutation of the numbers in the PIN) may indicate higher levels of threat. Of course, those skilled in the art will understand that many suitable variations of the PIN, portions of the account number, or other strings of numbers may be used for the first and second inputs consistent with the disclosure.

In the embodiment shown in FIG. 4 and described above, the ATM 65 transmits the user inputs to the security alert server 90 for the server to determine whether the inputs are valid or match predetermined number strings associated with a user account of the user. In some embodiments, however, it is contemplated that the ATM 65 itself may confirm the user inputs locally without transmitting information to the security alert server 90 or another bank server.

Figure 5:
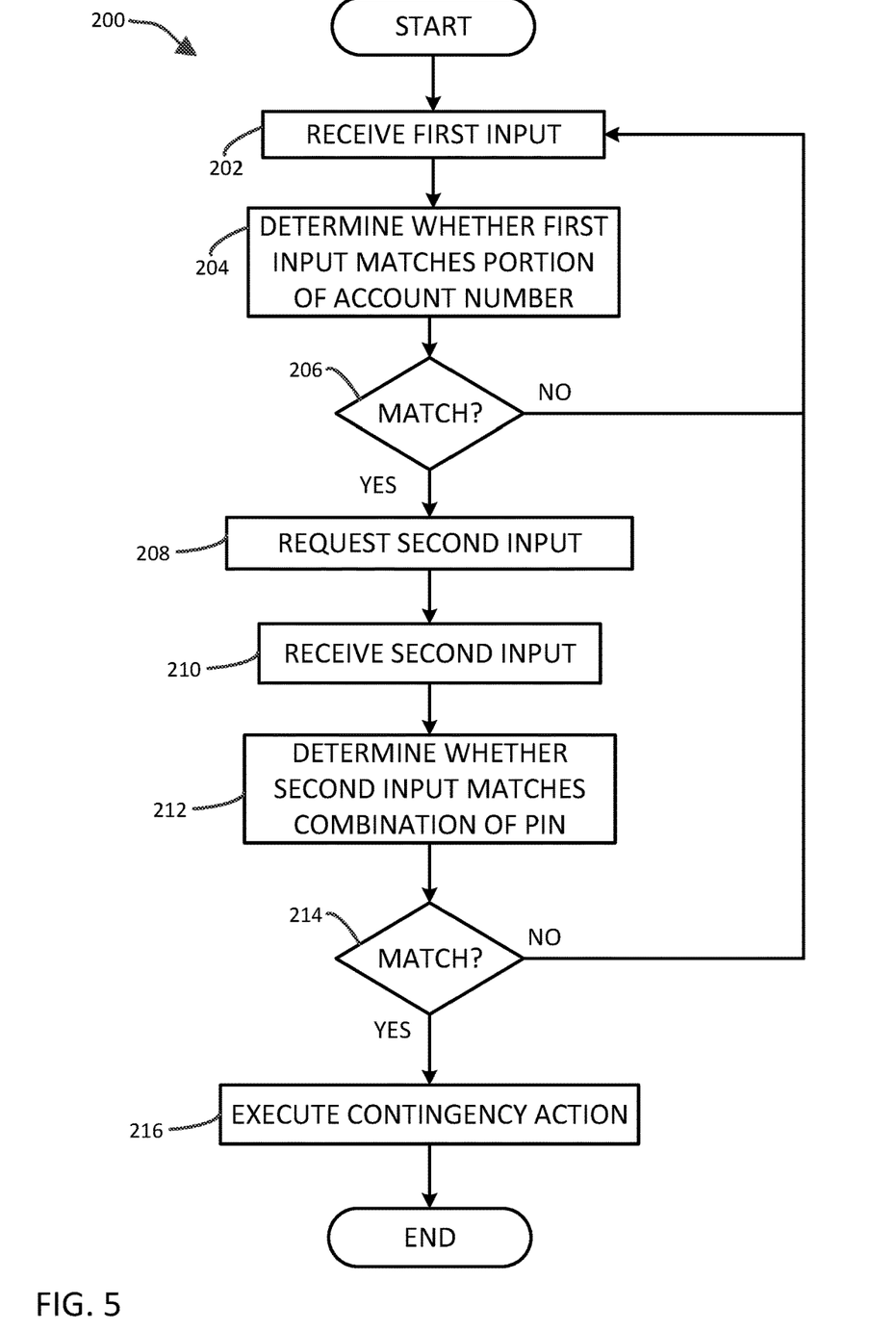
FIG. 5 is a flow chart of an embodiment of a process of using the system for security alerts in accordance with the disclosure.

FIG. 5 illustrates an embodiment of a method 200 of using the security alert system. At 202, the ATM 65, security alert server 90, or another entity operating the system may receive a first input such as may be entered by a user via a keypad on the ATM or other suitable user interface. As described in further detail above, the first input may be any string of numbers, letters, or both, e.g., a string of four, five, or six numerical digits. At 204, the system may determine whether the first input matches a portion of an account number of a user account associated with the user. In some embodiments, the portion of the account number may be the first four digits, the last four digits, the middle four digits, or another suitable combination of account number digits. In some embodiments, the first input must be a predetermined specific portion of the account number, but in other embodiments, any portion of the account number may be used. In some embodiments, the portion of the account number may be a primary threat indicator input associated with the user account. At 206, if the first input does not match a portion of the account number, then the system may reject the input as incorrect. In some embodiments, a predetermined number of incorrect inputs may cause the user's account to be locked, or other suitable actions. If the first input does match a portion of the account number, the ATM 65 or other device may, at 208, request a second input, such as through a user interface or display of the ATM. In some embodiments, the ATM 65 or the user account more generally may enter a threat indicator mode due to the user's input matching a primary threat indicator input, or in some embodiments, may execute one or more contingency actions.

At 210, the ATM 65 may receive a second input such as may be entered by a user via a keypad on the ATM or other suitable user interface. At 212, the system may determine whether the second input matches a combination of the user's PIN that the user may more generally use to access the account when no threat is present. In some embodiments, a combination or permutation of the PIN may be a secondary threat indicator input associated with the user account that may be configured to signal one of a variety of threat levels. At 214, if the second input does not match a combination of the user PIN, then the system may reject the input as incorrect. In some embodiments, a predetermined number of incorrect inputs may cause the user's account to be locked, or other suitable actions. If, at 214 the second input matches a combination of the digits in the PIN, the system may, at 216, execute one or more contingency actions as described in greater detail herein.

Figure 6:
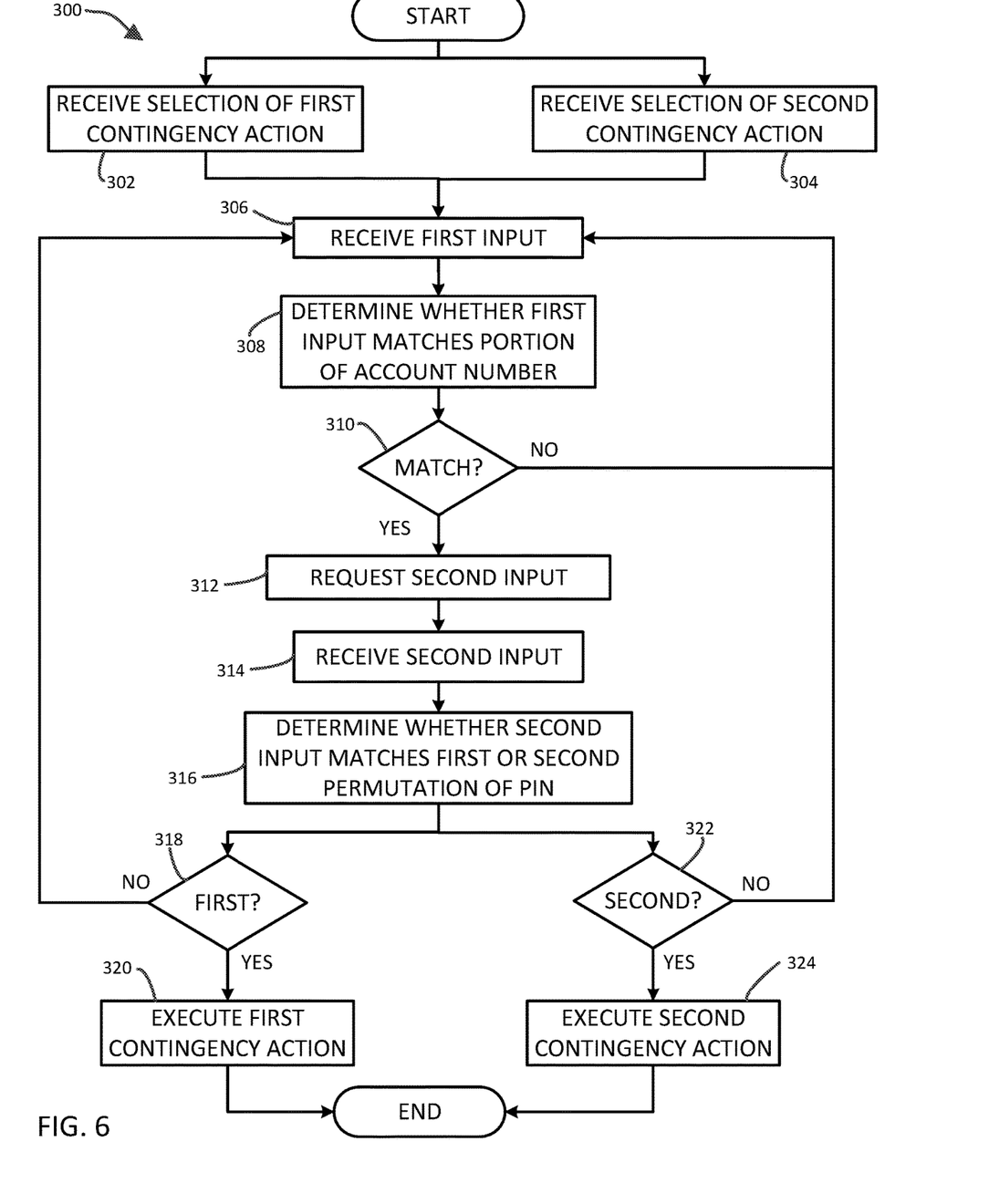

FIG. 6 shows another embodiment of a method 300 of using the security alert system disclosed herein. At 302, a security alert server, such as the security alert server 90 shown in FIG. 4 or another server of an entity operating the system, may receive a selection of a first contingency action associated with a user account. At 304, the security alert server 90 may receive a selection of a second contingency action associated with a user account. In some embodiments, the first and second contingency actions may be selected by a user via a user interface, or maybe assigned to the user account based on one or more properties of the user account.

At 306, the ATM 65, security alert server 90, or another entity operating the system may receive a first input such as may be entered by a user via a keypad on the ATM or other suitable user interface. As described in further detail above, the first input may be any string of numbers, letters, or both, e.g., a string of four, five, or six numerical digits. At 308, the system may determine whether the first input matches a portion of an account number of a user account associated with the user. In some embodiments, the portion of the account number may be the first four digits, the last four digits, the middle four digits, or another suitable combination of account number digits. In some embodiments, the first input must be a predetermined specific portion of the account number, but in other embodiments, any portion of the account number may be used. In some embodiments, the portion of the account number may be a primary threat indicator input associated with the user account. At 310, if the first input does not match a portion of the account number, then the system may reject the input as incorrect. In some embodiments, a predetermined number of incorrect inputs may cause the user's account to be locked, or other suitable actions. If the first input does match a portion of the account number, the server 90 or other device may request a second input at 312 via the ATM 65, such as through a user interface or display of the ATM. In some embodiments, the ATM 65 or the user account more generally may enter a threat indicator mode due to the user's input matching a primary threat indicator input, or in some embodiments, may execute one or more contingency actions.

At 314, the ATM 65 may receive a second input such as may be entered by a user via a keypad on the ATM or other suitable user interface. At 316, the system may determine whether the second input matches a first predetermined permutation of a user's PIN that the user may more generally use to access the account when no threat is present, or whether the second input matches a second predetermined permutation of a user's PIN. In some embodiments, a first permutation of the PIN may be a secondary threat indicator of a first perceived level of danger by the user, and the second permutation of the PIN may be a secondary threat indicator of a second perceived level of danger. At 318, in some embodiments, if the second input matches the first permutation of the PIN, the security alert server 90 may execute the first contingency action at 320 as selected by the user. At 322, if the second input matches the second permutation of the PIN, the security alert server 90 may, at 324, execute the second contingency action as selected by the user. In some embodiments, the first permutation of the PIN may indicate a less threatening situation than the second permutation of the PIN, and the first contingency action may be a less severe response than the second contingency action. In some embodiments, the second contingency action may include the first contingency action and an additional contingency action. For example, the first contingency action may include limiting the withdrawal levels available on the account for a predetermined amount of time, while the second contingency action may include limiting the withdrawal levels and contacting a law enforcement agency.

In each of the embodiments described above, various processes may be used to clear or to reset the contingency actions. The clearance may be conducted locally at the ATM 65 using either a code or verbal instruction. In another case, the user may log onto the user account from another device or location to clear the threat contingency action, such as be entering a password or answering security questions. In other cases, where a higher level of risk to a user may be a concern, clearing the threat indicator mode may include intervention by a third party as proof that the user is no longer under threat. For example, a friend or relative, bank employee, etc., may have to enter a code to clear the threat indicator mode, for example, by entering the code into the user's account.

As described, the security alert system offers a technical solution to a technical problem of using an ATM to alert one or more entities of a threatening situation while accessing a user account via an ATM. As ATMs traditionally include only limited inputs and interfaces available to a user during routine account access, a technical problem may include using those limited inputs and interfaces to provide means by which a user may alert law enforcement or other entities of a threat without alerting an attacker that the call for help or other contingency actions is occurring. Thus, in some embodiments, the system for security alerts described herein offers a technical solution to this problem at least by providing a computer implemented method for receiving user input that may seem generic to an attacker observing the user's actions but, due to technological changes to the ATMs, servers, or the software running on both or either, the system may interpret those inputs in a specific way to implement appropriate contingency actions.

The various participants and elements described herein may operate one or more computer apparatuses to facilitate the functions described herein. Any of the elements in the above-described Figures, including any servers, user terminals, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++ or Perl using, for example, conventional or object-oriented techniques. In some examples, the at least one processor may be specifically programmed.

The software code may be stored as a series of instructions, or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed (or physically configured) to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the system and the methods described herein may be configured to provide ATM users under threat to summon help or limit financial damage through technical means substantially invisible to an attacker. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computer-implemented method comprising:
performing an account set-up procedure including:
  receiving, at a security alert server, a user selection of a portion of an account number associated with a user account of a user, wherein the user selection of the portion of the account number is a primary threat indicator associated with the user account;
  receiving, at the security alert server, a user selection of a first combination of a personal identification number (PIN) associated with the user account, wherein the user selection of the first combination of the PIN is a first secondary threat indicator associated with a first contingency action; and
  receiving, at the security alert server, a user selection of a second combination of the PIN associated with the user account, wherein the user selection of the second combination of the PIN is a secondary threat indicator associated with a second contingency action; and performing a threat alert procedure including:
  receiving, at the security alert server via one of a plurality of automated teller machines (ATM):
    a transaction initiation identifying the user account, and
    a first ATM input from the user via an alphanumeric keypad on the ATM;
  determining, by the security alert server, that the first ATM input matches the primary threat indicator by matching the first ATM input to the portion of the account number associated with the user account;
  in response to the determination that the first ATM input matches the primary threat indicator:
    providing a visual indication via an ATM display of the ATM that the ATM has entered a threat indicator mode, and
    requesting a second ATM input from the user;
  receiving, at the security alert server and via the ATM, the second ATM input from the user via the alphanumeric keypad on the ATM;
  determining, by the security alert server, that the second ATM input matches one of the first secondary threat indicator or the second secondary threat indicator;
  executing, by the security alert server, the first contingency action when the second ATM input matches the first secondary threat indicator; and
  executing, by the security alert server, the second contingency action when the second ATM input matches the second secondary threat indicator,
wherein at least one of the first contingency action or the second contingency action includes at least one of locking access to the user account or limiting funds available for withdrawal from the user account, and
wherein the method is performed using one or more processors.

2. The method of claim 1 further comprising:
clearing the threat indicator mode in response to receiving a first clearance action when the second ATM input matches the first secondary threat indicator; and
clearing the threat indicator mode in response to receiving a second clearance action when the second ATM input matches the second secondary threat indicator, the second clearance action being different than the first clearance action.

3. The method of claim 2, wherein at least one of the first clearance action or the second clearance action includes an intervention by a third party other than the user.

4. The method of claim 1 further comprising reporting a user location to a law enforcement entity.

5. The mode of claim 1, wherein the first contingency action is different than the second contingency action.

6. The method of claim 5, wherein the first combination is a reverse order of the numbers in the PIN.

7. The method of claim 5, wherein:
receiving an input of the first secondary threat indicator indicates a first perceived level of danger; and
receiving an input of the second secondary threat indicator indicates a second perceived level of danger higher than the first perceived level of danger.

8. The method of claim 1 further comprising, based on the determination that the second ATM input from the user matches the first secondary threat indicator, causing a photograph to be taken of the user.

9. A non-transitory computer readable medium storing instructions that, when executed, cause an apparatus at least to perform:
receiving a user selection of a string of characters that matches a portion of an account number associated with a user account of a user, wherein the user selection of the string of characters that matches a portion of the account number is a primary threat indicator associated with the user account;

receiving, at the security alert server, a user selection of a first combination of a personal identification number (PIN) associated with the user account, wherein the user selection of the first combination of the PIN is a first secondary threat indicator associated with a first contingency action;

receiving, at the security alert server, a user selection of a second combination of the PIN associated with the user account, wherein the user selection of the second combination of the PIN is a second secondary threat indicator associated with a second contingency action;

receiving, via one of a plurality of automated teller machines (ATM):
 a transaction initiation identifying the user account, and
 a first ATM input from the user via an alphanumeric keypad;

determining that the first ATM input matches the primary threat indicator by matching the first ATM input to the portion of the account number associated with the user account;

in response to the determination that the first ATM input matches the primary threat indicator:
 providing a visual indication via an ATM display of the ATM that the ATM has entered a threat indicator mode, and
 requesting a second ATM input from the user;

receiving, via the ATM, the second input from the user via the alphanumeric keypad;

determining that the second ATM input matches one of the first secondary threat indicator or the second secondary threat indicator;

executing the first contingency action when the second ATM input matches the first secondary threat indicator; and executing the second contingency action when the second ATM input matches the second secondary threat indictor, wherein at least one of the first contingency action or the second contingency action includes at least one of locking access to the user account or limiting funds available for withdrawal from the user account.

10. The non-transitory computer readable medium of claim 9, wherein the instructions further cause the apparatus to:
 clear the threat indicator mode in response to receiving a first clearance action when the second ATM input matches the first secondary threat indicator; and
 clear the threat indicator mode in response to receiving a second clearance action when the second ATM input matches the second secondary threat indicator, the second clearance action being different than the first clearance action.

11. The non-transitory computer readable medium of claim 10, wherein the at least one of the first clearance or the second clearance action includes an intervention by a third party other than the user.

12. The non-transitory computer readable medium of claim 9, wherein the instructions further cause the apparatus to report a user location to a law enforcement entity.

13. The non-transitory computer readable medium of claim 9, wherein the first contingency action is different than the second contingency action.

14. The non-transitory computer readable medium of claim 13, wherein:
 receiving an input of the first secondary threat indicator indicates a first perceived level of danger; and
 receiving an input of the second secondary threat indictor indicates a second perceived level of danger higher than the first perceived level of danger.

15. The non-transitory computer readable medium of claim 9, wherein the instructions further cause the apparatus to, based on the determination that the second ATM input from the user matches the first secondary threat indicator, take a photograph of the user.

16. A security alert apparatus comprising:
 a memory; and
 a processor disposed in communication with said memory, and configured to issue a plurality of processing instructions stored in the memory, wherein the processor issues instructions to:
 receive a user selection of a portion of an account number associated with a user account of a user, wherein the user selection of the portion of the account number is a primary threat indicator associated with the user account;
 receive a user selection of a first combination of a personal identification number (PIN) associated with the user account, wherein the user selection of the first combination of the PIN is a first secondary threat indicator associated with a first contingency action;
 receiving a user selection of a second combination of the PIN associated with the user account, wherein the user selection of the second combination of the PIN is a second secondary threat indicator associated with a second contingency action;
 receive, via one of a plurality of automated teller machines (ATM):
  a transaction initiation identifying the user account, and
  a first ATM input from the user;
 determine that the first ATM input matches the primary threat indicator by matching the first ATM input to the portion of the account number associated with the user account;
 in response to the determination that the first ATM input matches the primary threat indicator:
  provide a visual indication via an ATM display of the ATM that the ATM has entered a threat indicator mode, and
  request a second ATM input from the user;
 receive, via the ATM, the second ATM input from the user;
 determine that the second ATM input matches one of the first secondary threat indicator or the second secondary threat indicator;
 execute the first contingency action when the second ATM input matches the first secondary threat indicator; and
 execute the second contingency action when the second ATM input matches the second secondary threat indicator,
 wherein at least one of the first contingency action or the second contingency action includes at least one of locking access to the user account or limiting funds available for withdrawal from the user account.

17. The apparatus of claim 16, wherein the processor further issues instructions to:
 clear the threat indicator mode in response to receiving a first clearance action when the second ATM input matches the first secondary threat indicator; and clear the threat indicator mode in response to receiving a second clearance action when the second ATM input matches the second secondary threat indicator, the second clearance action being different than the first clearance action.

18. The non-transitory computer readable medium of claim 9, wherein providing the visual indication includes changing a color of at least one of a text or a background of the ATM display.

* * * * *